June 12, 1956

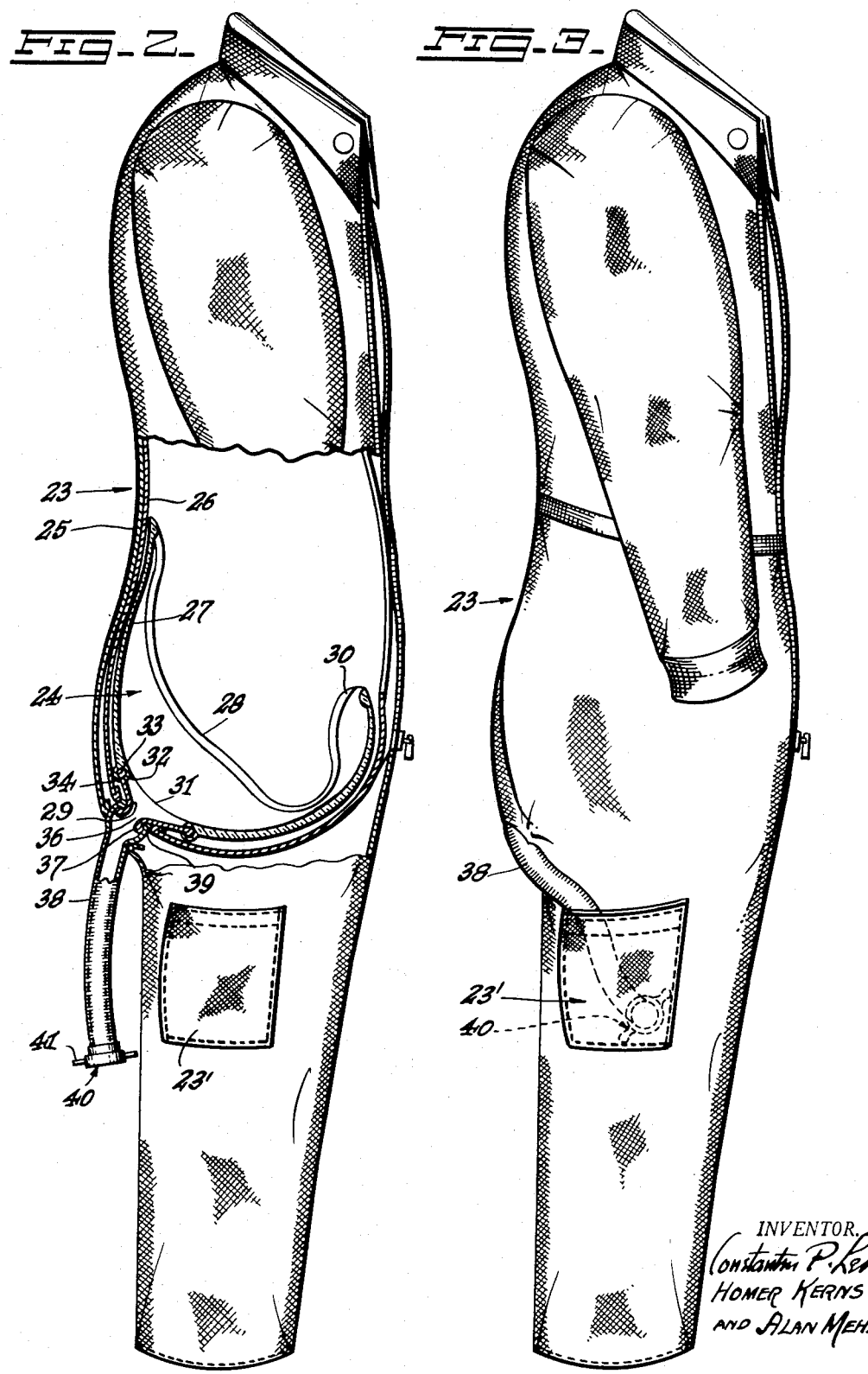

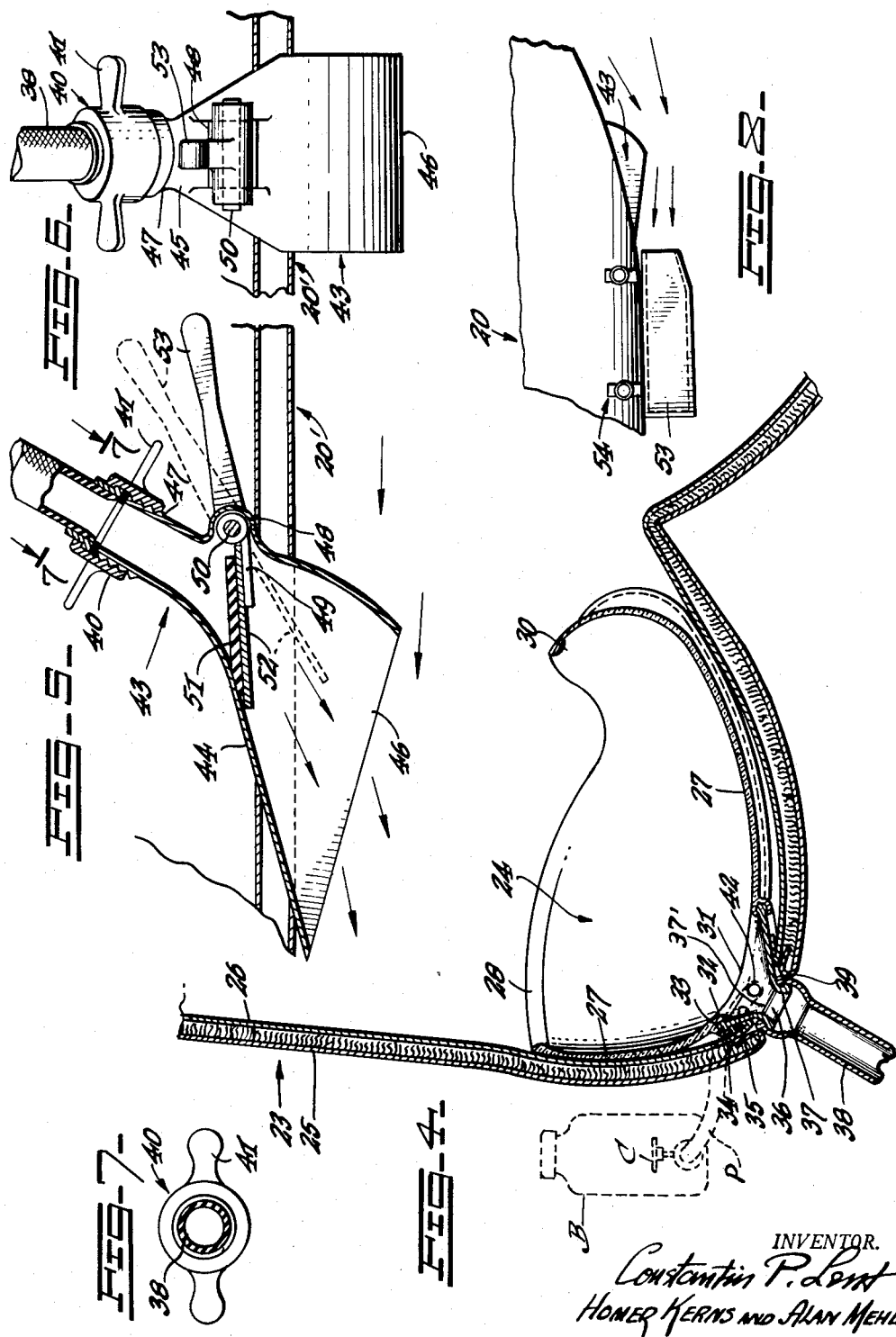

C. P. LENT ET AL 2,749,558

DEFECATION RELIEF UNIT FOR AEROPLANE
PERSONNEL AND SICK-BED

Filed Dec. 11, 1951

INVENTOR.
Constantin P. Lent
HOMER KERNS AND ALAN MEHLER

United States Patent Office

2,749,558
Patented June 12, 1956

2,749,558

DEFECATION RELIEF UNIT FOR AEROPLANE PERSONNEL AND SICK-BED

Constantin Paul Lent, Homer Kerns, and Alan Mehler, New York, N. Y.

Application December 11, 1951, Serial No. 261,065

15 Claims. (Cl. 4—10)

This device relates to feces and urine elimination cabinets and more particularly to defecation relief devices used by aircraft pilots and other key flying personnel. More particularly it relates to feces and urine elimination cabinets which may find utilization in single pilot driven aircraft.

Comparatively speaking it is an easy matter to provide adequate latrines for the men in the forces on land and sea. When the time comes to eliminate, one just walks to the nearest comfort station. But in the Air Force the problem of elimination can not be always solved that easily especially by aviation pilots. This defecation problem may also arise in other types of aircraft, to plague key flight personnel (such as tail gunners, observers, photographers, etc.) who must remain permanently at their stations for extended periods of time. In planes being operated by more than one man and where the duties of navigation of the craft are shared, when one man operates the controls of the aircraft the other can cater in privacy to his natural needs in lavatory cabinets provided in the plane for this purpose. But, in single seat aircraft where only one man operates the entire plane, no such fast relief is possible and the pilot must wait until he lands his plane.

The applicants are cognizant that there are relief tubes provided on most all jet planes for urinating, but no single seat aircraft is equipped with a safe and sure means for defecation. When the pilot of the jet, due to accident or enemy action needs to eliminate, the problem of defecation becomes acute. The pilot must wait until he lands his craft; and quite often he must remain aloft for a considerable length of time before he has a chance to visit a comfort station on the ground. In many cases due to the physiological and psychological effects produced on the pilot by enemy action, he is forced to eliminate even before he has a chance to land his plane.

In other types of aircraft, key flight personnel who must remain permanently at their stations during extended periods in danger areas, also have to face the pressing problem of defecation without leaving their position in danger zones. Human engineering and elimination of inherent physiological and psychological hazards and physical problems of single pilots and other key personnel in flight require the adoption of a practical means for feces and urine elimination in various types of aircraft.

The physiological, physical and psychological effect on the pilot under enemy fire is worth considering. The man flying a single pilot aircraft will feel more comfortable with a safe, sanitary and sure device for proper feces and urine elimination. Therefore it is imperative that all single seat planes be equipped with a "quicky" self-defecation unit.

The operation of such a defecation unit must be simplicity itself. With these units installed in aircraft, the pilot need not land his plane (nor do key flight personnel have to leave their stations in combat areas), but if necessary, can eliminate directly into their flying suits without leaving their seats or without the need for opening the flying suit to insert a relief tube into the suit as it is being done with present day urine elimination devices being installed in aircraft. With the use of the defecation unit of the present invention the products of elimination are collected into a form fitting refuse dish with which the flying suit is especially provided. To discharge the refuse, the defecation unit herein described, relies entirely upon the natural effect of the drag and suction produced by the air on the outer skin of the plane's fuselage when it is in motion. Subsequently the products of elimination may be discharged from the unit directly into the atmosphere or they can be gathered into a refuse collecting box provided for this purpose in the fuselage or under the belly of the plane.

The defecation relief cabinet herein described is provided with a relief tube which has a "quicky" release coupling which is being operated when the pilot has need to defecate or urinate, or both. The tube in question does not interfere with the pilot's (or flight personnel) natural walking or working movements nor with the performance of his (or their) duties in handling and navigation of the plane and in operating its armaments. Neither will it interfere with the pilot's (or flight personnel) bailing out of the plane. To discharge the feces and the urine from the defecation unit, the drag or suction can be regulated by a suction regulating valve the unit is provided with. The valve in question is air- and water-tight and will not permit the escape of the pressurized air from the aircraft's cabin when the defecation unit is not in use. The air suction created by the rushing air on the outside of the plane's fuselage will not only facilitate the discharge of the feces and the urine which may have accumulated in its defecation dish, but it also will thoroughly dry out the unit and keep it sanitary clean until the suit is removed.

If desired, the defecation unit can be equipped with a fluid container. The fluid can be used to flush the unit preliminary to and after defecation. The fluid in question can be contained within a sterilized bottle secured to the defecation unit or to the fuselage of the aircraft and released by means of a valve.

A defecation unit is an immediate and ever present requirement for single piloted aircraft and will add considerably to the safe operation of the plane over longer extended flights.

It is understood that with some minor modifications standard flight clothing and apparel can be adopted to the defecation seat of our invention and the defecation cabinet herein described can be easily installed in the layout of existing aircraft and can be incorporated into future aeroplane designs.

The defecation unit of our invention can be cleaned and sanitized after each use and can be worn again without any damage to its working components. No pilot can be without a sanitary, safe defecation unit and it is a must in a single piloted plane's standard equipment and for pilots' suits and clothing.

One object of our invention is to provide a sanitary, safe and fully effective defecation seat to be so constructed as to be an integral part of an aviation suit of conventional design.

Another object of this invention is to provide a defecation relief unit which will include a relief seat inside the aviation suit and a defecation relief cabinet secured to the outer portion of the fuselage of the plane.

Still another object of this invention is to provide a defecation relief seat which will be an integral part of an aviation suit itself having a defecation relief tube extending beyond the outer lining of the suit where it will end with a connection valve or flange.

An additional object of this invention is to provide upon the garment of the aviation suit a pocket which will house the relief tube including its connection valve, when the latter is not being used.

A still additional object of this invention is to provide means whereby atmospheric suction may be utilized to facilitate removal and/or dispersion of the products of defecation from a cabinet in which they have accumulated.

A still further object of this invention is to provide a quick acting connection securing the relief tube to the defecation relief cabinet, which will not interfere with the pilot's (or other personnel using similar defecation units) from bailing out of the plane.

A still further object of our invention is to provide a defecation relief valve which will connect the defecation cabinet with the atmosphere at the will of the pilot or other flight personnel, the relief valve being closed at any other time and not permitting the escape of pressurized air from the plane's cabin.

Another object of this invention is the application of our defecation unit for a hospital sick-bed.

Still another object of this invention is to provide a portable suction unit to produce air suction for the operation of our defecation unit being used for hospital sick-bed.

A still additional object of this invention is to provide a defecation relief unit to be utilized in children's clothing, diapers, cribs etc.

Further objects will be seen as the description of this specification will proceed.

Referring to figures:

Fig. 2 is a view showing a conventional aviation suit partly cut away to disclose details of construction of the defecation relief seat, the defecation relief tube and other details.

Fig. 3 is a view similar to the view shown in Fig. 2, showing the manner in which the defecation relief tube is being housed within a pocket which is located upon the outer garment of the aviation suit, when the tube is not being used.

Fig. 4 is an enlarged cross section through the defecation seat contained in the aviation suit shown in Figs. 2 and 3 inclusive showing the urinating pouch and other details.

Fig. 5 is a cross section through the defecation relief cabinet showing the feces and urine relief valve and its manner of operation.

Fig. 6 is a front outside view of the defecation relief cabinet being shown in Fig. 5.

Fig. 7 is a section taken on the line 7—7 of Fig. 5.

Fig. 8 illustrates a modification of the defecation relief cabinet shown in Fig. 5 and Fig. 6 and the application of the feces and urine refuse-box in conjunction with the defecation relief cabinet shown in Figs. 1 to 7 inclusive.

Figure 1:
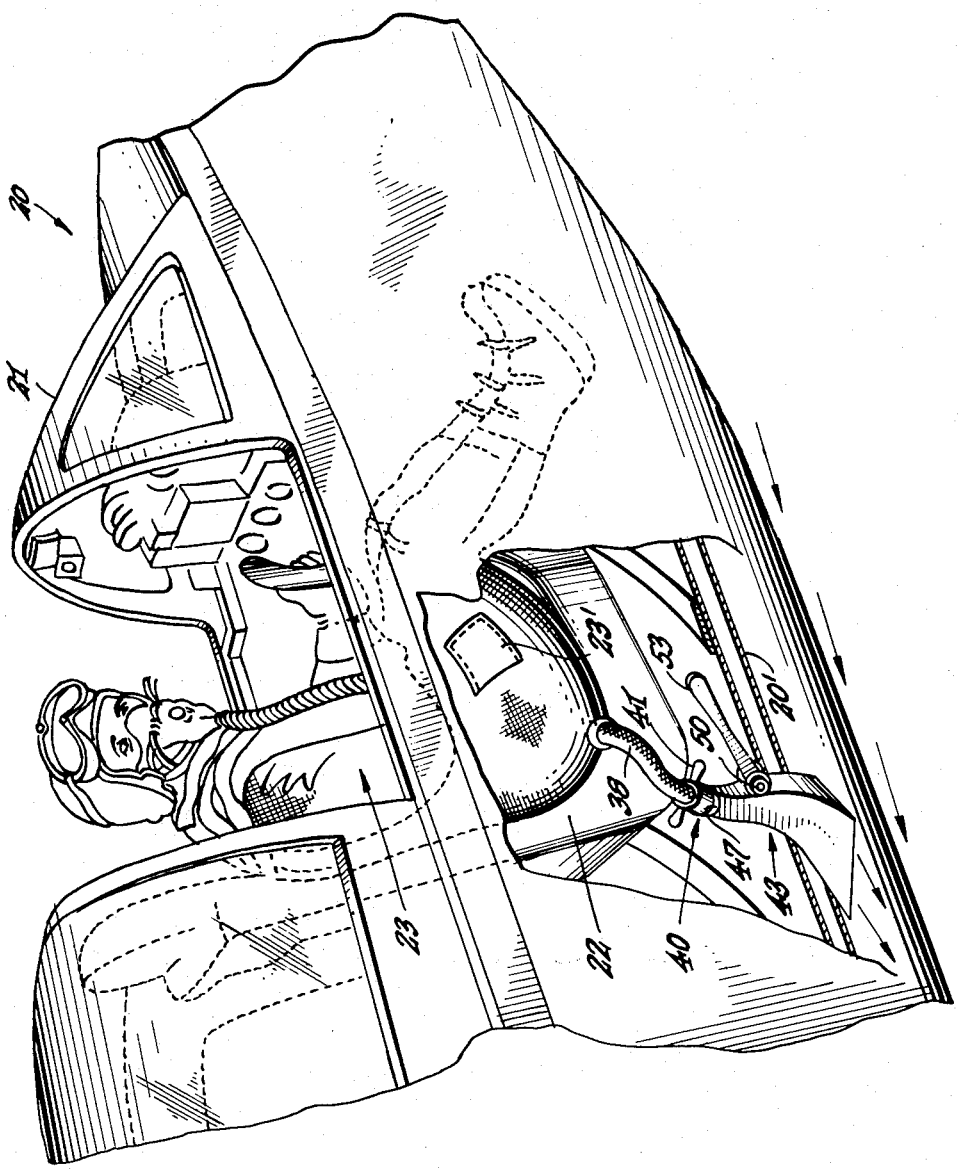
Fig. 1 is a perspective view of the cockpit of an aeroplane with its fuselage partly broken away to disclose the defecation relief seat, the defecation relief cabinet, the defecation relief tube and the manner in which the tube is being secured to the defecation relief cabinet preliminary to defecation.

Referring more particularly to Fig. 1, numeral 20 indicates the fuselage of a jet driven aircraft with its cockpit shown wide open to disclose the aviator being seated at the controls of the aircraft. The lower portion of the fuselage of the aeroplane is being shown partly broken away to expose the working arrangements and the details of the pilot defecation relief unit 24.

The aircraft in Fig. 1, is equipped with a conventional jettisoned seat 22 which can be ejected to clear the aircraft when the pilot of the plane must bail out. In the main the defecation relief unit 24 consists of two separate parts; a defecation relief seat, which is contained inside the lining of the aviation suit; and the feces and urine elimination cabinet, which is mounted in a convenient location close to the aviator's seat and within the fuselage of the plane. The pilot within the aircraft is shown wearing a conventional aviation suit 23 which is provided with the defecation seat or shell 27 (see also Fig. 2). The defecation relief unit 24 (including the defecation seat and the defecation cabinet) is produced in such a manner as not to interfere with the pilot's natural bodily movements inside the cockpit of the plane or when he is ready to use the jettisoned seat 22 to bail out.

More particularly referring to Figs. 2 and 3, showing in detail a plan view of a conventional aviation suit, partly cut open to disclose details, numeral 25 indicates the outer garment while numeral 26 indicates the inner lining of the suit; the latter conforming snugly to the natural contour of the pilot's body.

In reference to the defecation relief seat or shell 27, in the main it consists of a flexible shell member which is fitted with a reinforced rim 28 that runs all along its outside contour and is produced in such a manner as to conform to the form of the aviator's legs and thighs.

The bottom or lower portion of the defecation shell or seat 27 is shaped to conform to the shape of the aviator's buttock. In addition, the seat 27 has a urinating pouch member 30 which is shaped to fit the aviator's bodily outline of his urinating organ. The seat 27 may be made of sponge-rubber or the like flexible material and is being lined inside and out with a smooth skin or protective lining.

The defecation relief seat or shell 27 has a feces relief opening 31 which is especially reinforced with a rim 32 which ends into a recessed or grooved portion 33. The grooved portion 33 of the relief opening 31, runs around in a circle forming the defecation relief opening 31. A plastic defecation dish 29, having a reinforced portion or rim 34, is mounted into the grooved portion of the rim 33 of the defecation shell or seat 27.

A flexible length of tubing or pipe 38, made preferably of rubber or rubber-like material, is suspended by means of its turned-in edge 39 to the reinforced rim 37 of the defecation relief opening 35. The edge 39 of the tube 38 forms a watertight closure with the reinforced rim 37 of the discharge opening 36. The other end of the flexible tubing 38 is being fited with a connection valve including a flanged member 40 and a finger nut 41. The outer garment of the aviation suit 23 may be equipped with a pocket 23', the latter being used as a receptacle for the connection valve of the relief tube 38. The pocket 23' will house the end of the tubing 38 respectively its flange member 40 and finger nut 41, when they are not being used. Normally, the connecting valve is housed in the pocket 23' as not to interfere with the pilot's natural bodily movements, his personal comfort in the cockpit and his bodily movements when servicing the plane.

Fig. 4 illustrates the position of the defecation relief seat 27 in the aviation suit 23 and the manner in which it fits the bodily contour of the pilot's buttock. The suit 23 fits snugly to the aviator's buttock while the urinating pouch 30 completely covers his urinating organ.

The feces elimination dish 35 is provided with an opening 42 which permits the introduction of a disinfectant fluid inside it when it may be necessary to wash out the feces and urine from the defecation dish 35 and help better elimination. The disinfection fluid in question is contained within a bottle B carried in the aircraft and secured to the opposite end 37' of the defecation relief dish 35 by means of the pipe-fitting, or connection P (see Fig. 4).

More particularly referring to Figs. 5, 6, 7 and 8, they illustrate in detail the defecation discharge cabinet 43. In the main the cabinet 43 has a somewhat flared body 44 which is fitted with a narrower neck portion 45 and a wider mouth or discharge portion 46. The neck portion 45 carries a threaded portion 47 which receives the threaded connection valve's flange 40. The outside shell of the cabinet 43 has a partly extruded portion 48 which is fitted with a valve holder 49 and a valve operating shank or shaft 50. A valve gasket, made of a flat sheet of rubber-like material 51 is secured to a valve plate 52, while the plate 52 is mounted upon the valve holder 49. The extension of the shaft or shank 50, which extends beyond the cabinet 43, is secured to a valve handle or arm 53 which is being used to operate the valve when it is desired to open it to discharge the feces and the urine from the defecation relief suit 23 or to close it when the cabinet is not being used.

Figure 9:
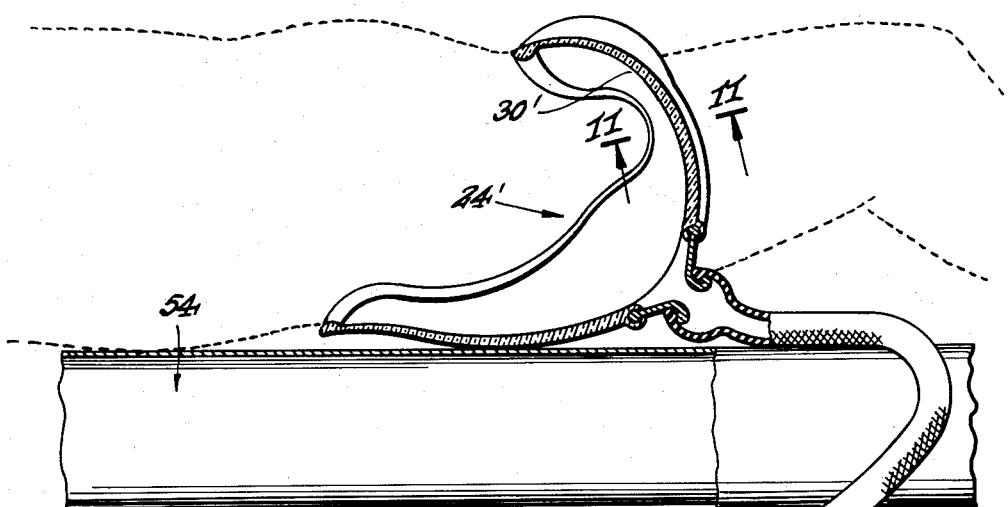
Fig. 9 is a further modification of the defecation seat showing its application to a hospital sick-bed.
Figure 11:
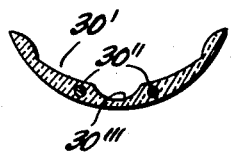
Fig. 11 is a cross section taken on the line 11—11 of Fig. 9, showing details of the construction of the urinating pouch.
Figure 10:
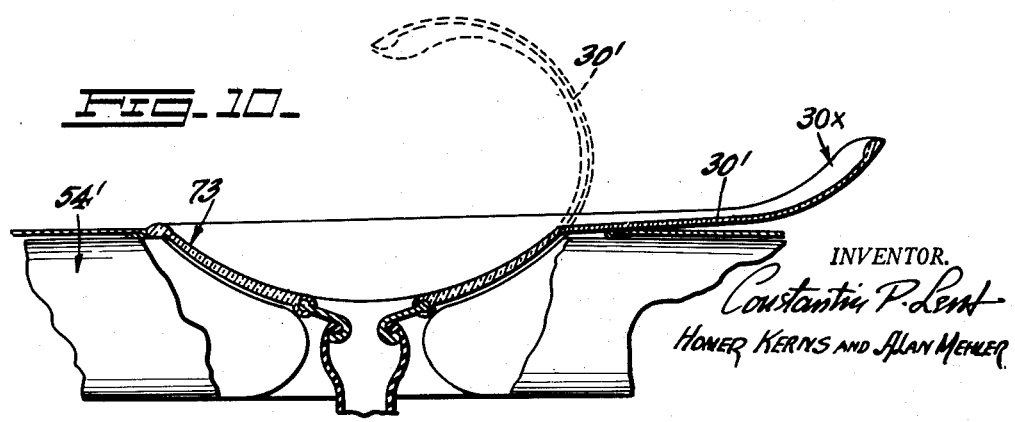
Fig. 10 is a further modification of the defecation seat shown in Fig. 9, showing its application to a mattress for a hospital sick-bed.

Referring to the modification shown in Figs. 9, 10 and 11, the figures show the application of the defecation seat or shell 27 (shown in Figs. 1 to 8 inclusive) to a hospital sick-bed. Fig. 9 shows the patient (in dotted lines) laying flat upon a hospital mattress with the defecation relief seat or shell 24' being fitted to his buttock.

The defecation seat or shell 24' is similar in construction to the defecation shell 27 shown in Figs. 1 to 8 inclusive, but the relief tube or discharge pipe 38', is in this latter case somewhat longer and through the medium of the connecting valve 40' and the finger nut 41' connects directly to a mechanical suction device 55.

The connection valve 40' is being screwed into the pipe elbow 56 which is fitted with a length of pipe 57. The pipe 57 is inserted into the neck 59 of the feces eliminator flask 58 and is being held thereto by means of the threaded portion 59.

To lift the feces eliminator flask 58 from its seat 61 it has a carrying handle 60'. The seat 61 is being located upon the base plate 62. The flask 58 has a secondary neck 63, with a ninety degree bend in respect to the neck 58, and is provided with a flange 64. The flange 64 secures the pipe length 66 to the pipe elbow member 63. The pipe 66 passes through an opening 65 in the cover 71 and is attached to the suction end of a low-suction centrifugal pump 67. It is understood that various other makes of suction pumps may be used in place of a centrifugal pump as shown. The pump 67 is being operated by means of an electric motor 68 driven by house current supplied to it by means of a plug and wire 69 and the electric on-and-off switch 70. The motor 68 and the centrifugal pump 66 are both being mounted to the base plate 62 and are housed under the cover 71. The whole unit including the base plate 62, the pump 66, the electric motor 68 and the flask 58 can be carried about by means of the carrying handle 72 which is fastened to the cover 71.

A further modification of the defecation shell or seat shown in Fig. 9, is being shown in Fig. 10, illustrating the manner in which the defecation relief shell or seat 73 is built into the mattress 54' of a hospital sick-bed. In this case the urinating pouch 30' is made of a flap member 30x which may be flapped on and off at will to cover the patient's urinating organs when the patient needs to eliminate.

Fig. 11 is a section taken on the line 11—11 of Fig. 9, showing the manner in which the urinating pouch 30' is being reinforced by means of a pair of flexible wires 30" which also are being used as stiffeners. The wires 30" are imbedded into the material of the pouch 30'. Fig. 11 also shows the position of the urine elimination canal or groove 30''' which is contained within the urinating pouch 30' to facilitate urine elimination.

With some minor modifications the defecation unit and the defecation seat shown in Figs. 1 to 11 inclusive, may be used in infants' clothing, in diapers and in cribs.

Having described my invention, it is understood that I do not wish to limit myself only to the details herein described but wish to cover all possible modifications limiting myself only by the scope of the appending claims.

*Operation*

The defecation relief suit of the present invention can be hardly distinguished from a conventional aviation suit. It is very similar in construction and design and outwardly resembles a standard aviation suit but containing upon its outer garment an additional pocket 23', which is stitched to the right (or left) side of the trousers of the suit, plus the discharge end of the defecation relief tube 38, the latter being housed within the pocket 23' when not in use.

Normally, the discharge end of the defecation tube 38 is carried housed within the pocket 23' and will not in any way interfere with the natural walking movements of the pilot, neither with his ability to be seated comfortably on his seat in the cockpit of the plane or interfere with the navigation of the aircraft. The connection valve of the defecation discharge tube 38 is secured to the receiving neck 47 of the defecation discharge cabinet 43 only when the pilot feels the need to eliminate, and not before.

When the pilot has a desire for feces or urine elimination, he simply removes the connection valve of the defecation discharge tube 38 from the pocket 23' and attaches it onto the neck 47 of the defecation cabinet 43. With the connecting valve being securely threaded to the defecation relief cabinet 43, the pilot need not concern himself with anything else. He may defecate or urinate at will right into the defecation relief seat of shell contained within his aviation suit.

To facilitate the efficient elimination of the feces and the urine from the defecation cabinet 43, the natural suction created by the air upon the outer skin of the fuselage of the aircraft is being used. To this purpose, the pilot operates upon the valve handle 53 opening the valve sufficiently to create just enough drag or suction to help the elimination of the defecation refuse which has collected in the defecation cabinet 43. The suction thus created will drain out the refuse which has accumulated within the defecation cabinet 43 and within the defecation seat or dish 31 in the pilot's suit. The pilot can decide or judge for himself how much suction he can stand without any ill effects to himself, and accordingly he may regulate the opening or closing of the defecation relief valve 53.

Under normal conditions, the suction created through the opening of the defecation relief valve (or suction valve) 53 will not only drain and eliminate the feces and the urine, which have collected in the defecation relief cabinet and in the defecation relief seat, but also will be beneficial in drying out thoroughly the defecation seat and cabinet and without any serious ill effects upon the pilot.

If the aviator desires further help in draining and sterilizing the defecation seat in his suit, he may open the valve C which is located upon the disinfectant bottle B, permitting the disinfectant fluid to enter into the cavity of the defecation dish or seat 31 and wash it out clean.

When the pilot is entirely finished with his natural needs, he may remove the connecting valve from the defecation cabinet and replace it in the pocket 23'. But in the event that he may forget to do so, and should he be suddenly forced to bail out from the plane, the fact that the defecation relief tube 38 is still connected to the defecation cabinet, will not prevent him from bailing. The tube will simply disengage itself from its place of contact with the neck of the defecation discharge opening 36; its turned-in end 39 disengaging itself entirely from the reinforced rim 37 of the defecation dish 31.

After being thoroughly cleaned and sterilized, the defecation seat contained within the aviation suit may be used again. When not in use, the connecting valve of the feces discharge tube 38 may be packed within a sterilized bag or sack and then placed into the pocket 23' until further use.

The defecation relief seat 27 may be made as an integral part of a standard aviation suit, while the defecation relief cabinet 43 may be built as an integral part of the fuselage of the plane or as a mere auxiliary. The cabinet 43 also may be secured to the aircraft as a mere accessory. In addition, a refuse collection box 53 may be mounted upon the outer skin of the fuselage of the aircraft to gather or collect the feces refuse as it leaves the defecation relief cabinet. When the plane lands, an attendant disengages the refuse box 53 from the fuselage to replace it with another. After emptying the refuse contained in the refuse box 53, and having it thoroughly sterilized, the attendant may replace the box to the plane if he so desires.

The defecation relief seat or dish for hospital sickbed illustrated in Figs. 9 to 11 inclusive is being used for feces and urine elimination by patients of hospitals, upon operating tables, etc.

The defecation relief seat 24' (see Fig. 9) is being worn at all times by patients permitting elimination of feces and urine at will without the help of an attendant. The suction unit for feces and urine elimination is generally located under the bed and suction is applied when necessary.

In Fig. 11 it can be seen that the urinating pouch 30' is provided with a urinating canal 30" to facilitate the elimination of urine and its drainage into the defecation seat or dish 24'.

In Fig. 10, it can be seen that the defecation relief seat or dish 73 is built right into the mattress of a hospital bed. Otherwise the operation of the unit is very similar as the operation of the defecation relief seat 24' already described.

A similar unit as shown in Fig. 10, may be also incorporated in cribs to facilitate feces and urine elimination of infants. With slight modifications as to size and the kind of materials used the defecation cabinet and seat herein described may be used in infants' clothing or in diapers.

Having described our invention what we claim is:

1. In a defecation means, a defecation relief seat included in combination with the lining of a conventional aviation suit, a defecation discharge tube means, said defecation tube means leading from said defecation seat to a defecation discharge cabinet, and connecting means for securing said discharge tube means to said defecation relief cabinet.

2. In a defecation means for aviators including a defecation relief seat, said seat being included in combination within the lining of an aviation suit and being an integral part thereof, a flexible defecation discharge tube means leading from said seat in said suit to a defecation relief cabinet; connecting flange means for securing said tube means to said cabinet, and suction means to facilitate the elimination of feces and the urine from the defecation relief cabinet aforesaid.

3. In a defecation relief means including a defecation relief shell or seat being in combination contained within the lining of an aviation suit and being an integral part thereof, a discharge opening in said shell, a defecation dish being in direct communication with said opening, a discharge canal in said dish, tube means leading from said canal in said dish and connecting with a defecation relief cabinet, and means in said discharge means for the introduction of a disinfection fluid to flush out the feces and urine from the defecation means aforesaid.

4. In a defecation discharge means for an aviation suit including in combination a defecation relief seat and a urinating pouch, said seat and said pouch being contained within the lining of the aviation suit and being an integral part thereof, said seat having a defecation relief opening, a defecation dish being fitted into said opening and being in direct communication with said seat and said pouch, a defecation relief opening in said defecation dish, a reinforced rim around the defecation opening in said dish, flexible tube means connecting said defecation dish to a defecation relief cabinet, said tube means being in direct communication with said feces and urine relief seat and said pouch, said tube means being fitted over the reinforced rim around said defecation opening in said dish, said tube means being automatically disjoined from said rim when the aviator must bail out.

5. In a defecation aviation suit means including a defecation relief pouch, said pouch being included in the lower portion of said suit and being an integral part thereof, said pouch conforming to the bodily contour of the buttock of the aviator wearing the suit, a flexible defecation discharge tube connecting said pouch to a discharge cabinet, and suction means to facilitate the discharge and expulsion of the feces and the urine from said pouch.

6. In a defecation aviation suit means including a defecation relief pouch, said pouch made of a flexible rubber-like material and being included in the lower portion of said suit, said pouch being an integral part of said suit, said pouch snugly conforming to the bodily contours of the buttock of the aviator wearing said suit; a flexible defecation discharge tube, said tube contacting said pouch and connecting it to a defecation discharge cabinet, said cabinet having a release valve manually operated, and suction means to facilitate the discharge and the expulsion of feces and urine from the defecation pouch in said aviation suit means.

7. In a defecation aviation suit means including a defecation relief pouch fitted into said suit, said pouch being an integral part of said suit, said pouch made of flexible rubber-like material and made snugly to fit to the bodily contours of the buttock of the aviator wearing said suit; a flexible defecation discharge tube being a part thereof, said tube contacting said pouch and connecting it to a defecation discharge cabinet, a relief valve in said cabinet, the manual operation of said relief valve opening said valve to connect said pouch to said cabinet for the discharge of its content.

8. The same structure as set forth in claim 7; and a pipe coupling included to connect said discharge tube to said defecation relief cabinet.

9. In a defecation aviation suit means including a means for feces and urine discharge and including in combination a defecation pouch means and a defecation discharge cabinet means, said pouch means being an integral part of said aviation suit, said discharge means being an external part thereof; said pouch means made of flexible rubber-like material and made to fit snugly to the bodily contours of the buttock of the aviator wearing said suit, said defecation discharge means including a feces and urine collecting cabinet means, a flexible pipe connecting said pouch means in said suit to said cabinet means, a release valve means in said cabinet means.

10. In a defecation aviation suit means of the class described including in combination a defecation pouch means and defecation discharge means, said pouch means made of flexible rubber-like material and formed to conform to the bodily contour of the aviator wearing said suit, said pouch means being an integral part of said suit means, said defecation discharge means including a feces and urine collecting cabinet, a flexible pipe connecting said pouch to said cabinet and being made fast thereto by means of a pipe fitting, a release valve in said cabinet, to facilitate the expulsion of the feces and urine in said cabinet to the atmosphere.

11. In a defecation means including in combination a defecation pouch means and a defecation discharge means, said pouch means made of flexible rubber-like material and formed to conform to the bodily contour of a wearer, said defecation discharge means including a suction creating means and a flask to contain the feces and urine of defecation, a flexible piping connecting said pouch means to said flask, the operation of said suction creating means drawing any feces and urine contained in said pouch means into said flask.

12. In a defecation means of the class described including in combination a pouch made of flexible rubber-like material made to conform to the bodily contours of the buttock of the individual using said pouch for the purpose of defecation, and a device for discharging the feces and urine contained in said pouch as the result of defecation, said device including a portable base, said base including a suction pump and an electric motor to operate said pump and a feces and urine collecting flask, a flexible piping connecting said pouch to said flask by means of a pipe coupling, the operation of said electric motor upon said suction pump creating a vacuum in said flask permitting the atmospheric pressure to force any feces and the urine contained within said pouch to pass into said flask, the uncoupling of said pipe coupling permitting the removal of said flask from said base for the purpose of discharging and emptying any feces and urine contained in said flask.

13. In a defecation aviation suit including a defecation relief pouch and a defecation discharge tube, said pouch made to conform to the bodily contours of the buttock of the aviator wearing said suit, said tube being detachable from said defecation pouch, a discharge opening in said pouch, a reinforced lip around said opening, said tube having at one end thereof a reinforced portion fitting over said lip yet being detachable thereof, the other end of said tube having a flange.

14. In a defecation relief aviation suit including a defecation relief pouch and a defecation discharge tube, said pouch made to conform snugly to the bodily contours of the buttock of the aviator wearing said suit, said pouch having a discharge opening, a reinforced lip or edge around said opening, said defecation discharge tube having at one end thereof a reinforced portion fitting over said lip in said pouch, the other end of said tube having a flange, and a pocket in said aviation suit, said flanged end of said tube being housed in said pocket when said defecation relief pouch is not being used.

15. In an aviation suit including a defecation relief pouch, a defecation relief or discharge tube, and a flange to secure said tube to a defecation discharge valve in the aeroplane, said pouch being made of flexible material fitting snugly over the buttock of the aviator wearing said suit, said pouch having a defecation discharge opening, an edge around said opening, said tube having at one end thereof a reinforced portion fitting snugly over said edge, said reinforced tube portion being automatically detachable from said edge in said pouch when the aviator wearing said suit bails out from the aeroplane.

References Cited in the file of this patent

UNITED STATES PATENTS

| Number | Name | Date |
|---|---|---|
| 367,495 | Angell | Aug. 2, 1887 |
| 719,811 | Kent | Feb. 3, 1903 |
| 807,750 | Lande | Dec. 19, 1905 |
| 815,481 | Smith | Mar. 20, 1906 |
| 940,958 | Duval | Nov. 23, 1909 |
| 1,130,441 | Somerville | Mar. 2, 1915 |
| 1,362,751 | Snyder | Dec. 21, 1920 |
| 1,818,586 | Schumacher | Aug. 11, 1931 |
| 2,300,109 | Dahlke | Oct. 27, 1942 |
| 2,573,414 | Dunn | Oct. 30, 1951 |

FOREIGN PATENTS

| Number | Country | Date |
|---|---|---|
| 378,760 | France | Aug. 22, 1907 |